United States Patent

Clark

[11] Patent Number: 6,052,230
[45] Date of Patent: Apr. 18, 2000

[54] OPTICAL BLURRING FILTER WHICH IS RESISTANT TO DIGITAL IMAGE RESTORATION

[75] Inventor: Walter Dennis Clark, Fullerton, Calif.

[73] Assignee: Northrop Grumman Corporation, Los Angeles, Calif.

[21] Appl. No.: 09/113,878

[22] Filed: Jul. 10, 1998

[51] Int. Cl.[7] ................................................. B02B 27/10
[52] U.S. Cl. ................................................ 359/626; 359/619
[58] Field of Search .............................. 359/626, 625, 359/619, 622, 637

[56] References Cited

U.S. PATENT DOCUMENTS

| | | | |
|---|---|---|---|
| 4,175,844 | 11/1979 | Glaser-Inbari | 354/110 |
| 5,453,844 | 9/1995 | George et al. | 358/426 |
| 5,479,026 | 12/1995 | Schumtz et al. | 250/568 |
| 5,581,408 | 12/1996 | Schumtz et al. | 359/622 |
| 5,768,022 | 6/1998 | Lawandy | 359/620 |

*Primary Examiner*—Georgia Epps
*Assistant Examiner*—Timothy Thompson
*Attorney, Agent, or Firm*—Terry J. Anderson; Karl J. Hoch, Jr.

[57] ABSTRACT

An optical filter for intentionally blurring camera images has a generally transparent material and a plurality of optical distortions formed in the transparent material. Placement of the transparent material longitudinally in the optical path of a camera in front of the aperture stop allows contouring the blur across the image plane. That contour is preferably random, so as to defeat digital methods for image restorations. Additionally, a linear gradient is utilized to even-out the ground resolution on oblique cameras or localized to even-out resolution on cameras that have areas of unwanted high resolution.

33 Claims, 4 Drawing Sheets

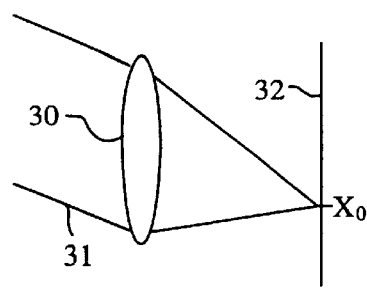
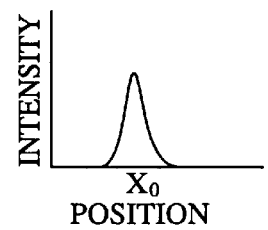
Fig. 4  Fig. 4a
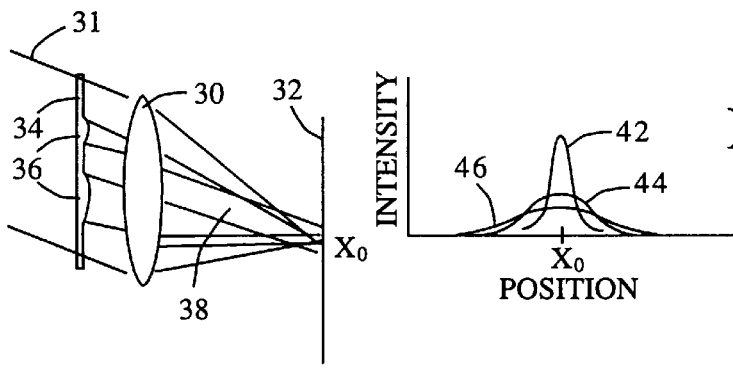
Fig. 5  Fig. 5a
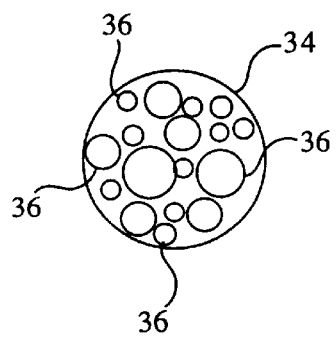
Fig. 6

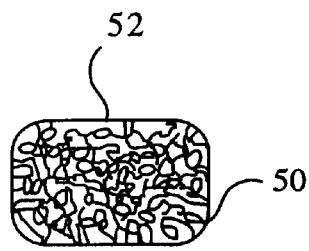
Fig. 7
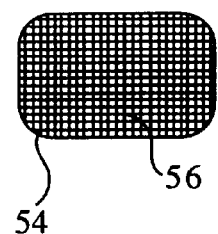
Fig. 8
Fig. 9
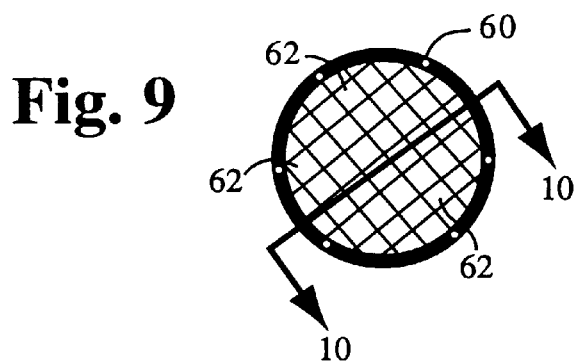
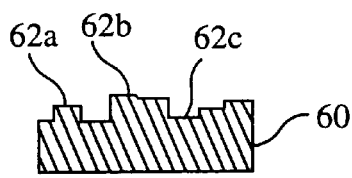
Fig. 10
Fig. 11
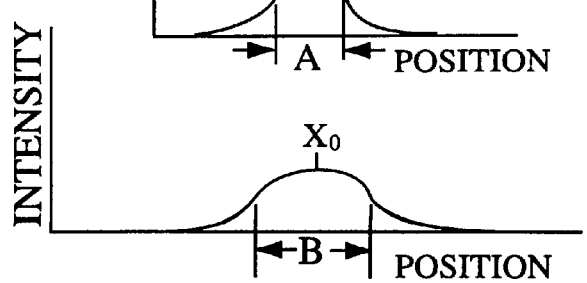
Fig. 12

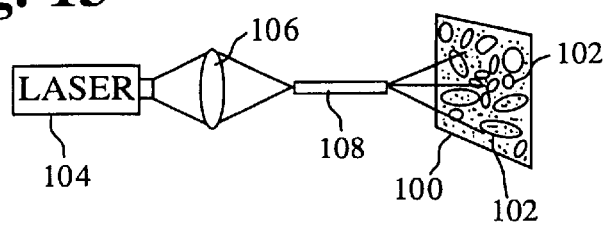
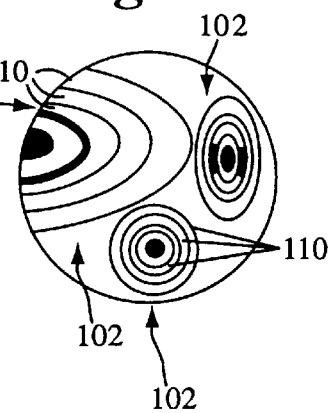
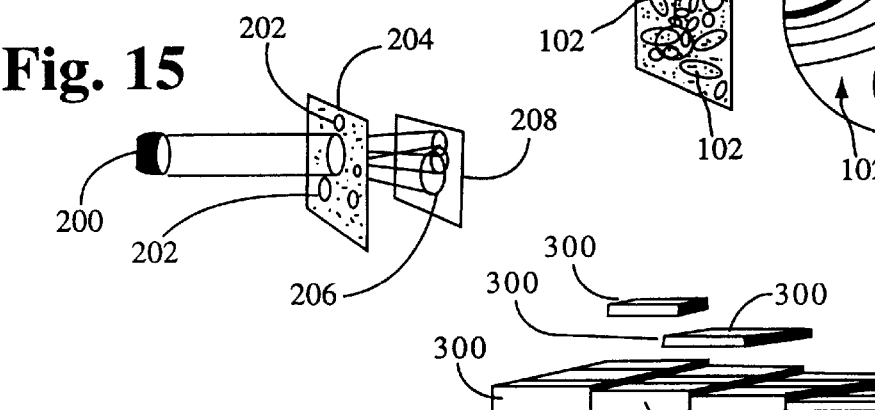
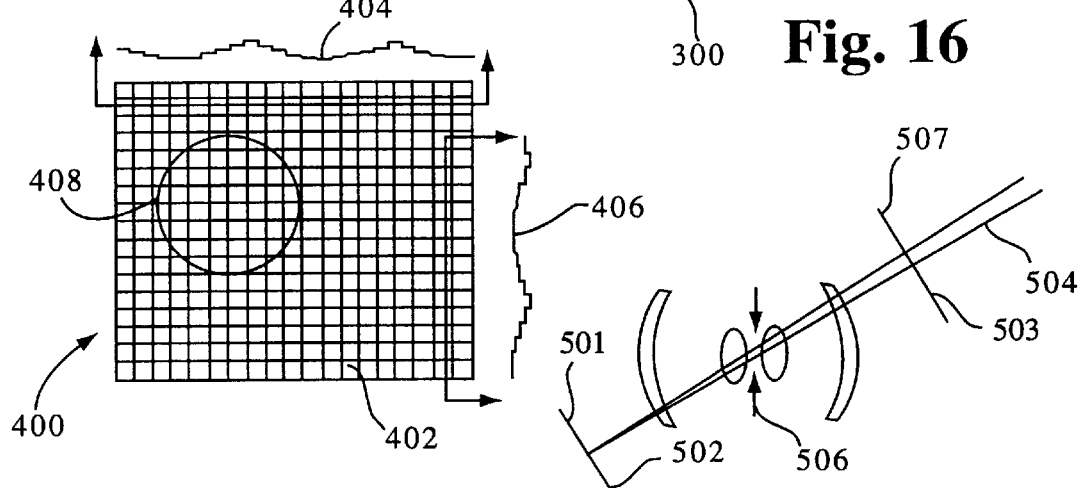

OPTICAL BLURRING FILTER WHICH IS RESISTANT TO DIGITAL IMAGE RESTORATION

GOVERNMENT RIGHTS

This invention was made with Government support under contract DNA001-93-C-0223 awarded by the Defense Special Weapons Agency. The Government has certain rights in this invention.

FIELD OF THE INVENTION

The present invention relates generally to optical filtering and more particularly to an optical blurring filter for intentionally introducing a desired degree of optical blurring into a camera so as to comply with resolution limits such as those specified by a treaty.

BACKGROUND OF THE INVENTION

The use of aerial photography in surveillance applications is well known. Typically, an aircraft flies over the desired area and photographs the ground utilizing equipment and techniques which tend to optimize the resolution of the resulting photographs. Such optimization of the resolution of the photographs is typically desirable so as to enhance the photointerpreters ability to accurately and reliably determine the content of the photographs.

However, in some instances, it is desirable to limit the resolution of the photographs obtained from aerial photography and the like. One instance where such resolution limitation is desirable is when such aerial photography is being performed according to a treaty which specifies the maximum, i.e., best, resolution, with which such photographs may be taken. For example, the Open Skies Treaty limits the ground resolution of aerial photography performed according thereto to 30 cm.

Thus, in order to comply with such a treaty, or so as to otherwise limit the resolution of a camera or other optical instrument, it is desirable to provide means for blurring photographs which is low cost, easy to use, and verifiable according to the terms of the treaty, if any.

It is further desirable that such means for limiting the resolution of pictures not require the blurring process take place after an original image is created. The reason is that the original must be disposed of in a secure manner. Those skilled in the art will appreciate that if the original image is formed at full resolution and after that a second image is generated therefrom at the desired resolution, such procedure makes it possible for some people to have access to the original, full resolution image. Thus, it is desirable to provide means for limiting the resolution of a camera such that only a degraded, i.e. resolution limited, image is formed.

It is further desirable that any such resulting resolution limited image not be capable of digital resolution enhancement. Thus, the image must be degraded in a manner which introduces substantially random noise so as to avoid subsequent reconstruction of an imaging having greater resolution than that of the original blurred image.

SUMMARY OF THE INVENTION

The present invention specifically addresses and alleviates the above mentioned deficiencies associated with the prior art. More particularly, the present invention comprises an optical blurring filter for intentionally blurring camera images, the filter comprising a generally transparent material and a plurality of optical distortions formed in the transparent material. The optical blurring is done in a place where there is control of the amount of blurring as a function of position in the film plane. Placement of the transparent material in front of a wide angle camera lens, e.g., where filters are typically positioned, effects this control. According to the preferred embodiment, such image blurring is performed in a manner which substantially mitigates the possibility and amount of subsequent digital reconstruction of the image at its original resolution. Also, no full resolution image is created in the process which might subsequently escape destruction.

The optical blurring filter comprises a transparent material having a plurality of optical distortions formed therein. The optical distortions are formed so as to have substantially random point spread functions throughout the image. The point spread functions have a width and a shape which causes a predetermined degree of blurring, so as to provide a desired loss of resolution which is similar to the loss of resolution which results when the altitude of an aerial camera is increased above the scene being photographed.

According to a first embodiment of the present invention, the optical distortions preferably are caused by lenslets.

The transparent material preferably comprises a sheet of transparent material, which is formed into a filter configuration such that it may be mounted to a camera in a manner similar to that in which colored and effects filters are typically mounted to the camera.

According to the preferred embodiment of the present invention, the transparent material comprises glass. However, those skilled in the art will appreciate that various other transparent materials are likewise suitable. For example, various different polymers, plastics, acrylics, minerals (e.g., diamond, quartz), may likewise be utilized.

The optical distortions are formed in a gradient on the transparent material and positioned in front of the aperture stop to provide greater resolution reduction on one side than on the other side. This is of value when performing oblique photography where treaty limits ground resolution. This can compensate for the inherently greater resolution of the near side of an image according to contemporary methodology for performing oblique photography.

In a similar manner, optical distortions formed in the transparent material are formed so as to provide greater blurring in selected directions through the lens so as to compensate for areas of greater resolution of the camera. For example, camera lenses typically provide better resolution on-axis, where aberrations of the lens are typically at their lowest value. By providing greater blurring for angles near the lens axis the resolution of the photographic image will tend to be more uniform.

According to a first preferred embodiment of the present invention, the optical distortions occur in a lenticular filter. As used herein, the term lenticular filter is defined to include a generally planar sheet of material having a plurality of lenslets formed thereon.

Thus, according to the first embodiment of the present invention, the optical distortions are preferably created by a lenticular filter which comprises a plurality of small lenses or lenslets formed in a generally transparent material. The lenses are preferably formed such that a photograph taken therewith is formed only with light which was transmitted through at least one of the lenses. Thus, the blurring can be created by introducing a few lenslets which distort only a portion of the imaging light. Alternatively, all of the light can be distorted. The lenses are preferably formed to have lens powers randomly selected according to a Gaussian or any other distribution about a selected power. Preferably, the lenses are formed so as to substantially overlap one another on the surface of the transparent material.

Optionally, the lenticular filter comprises a plurality of lenslets wherein each lenslet has a generally circular or elliptical periphery. The major axis and the minor axis for each lenslet is preferably substantially random in length and angular orientation, thereby providing a plurality of substantially overlapping, randomly oriented lenslets, each having a substantially random power.

The lenticular filter preferably comprises a plurality of lenslets formed so as to define a plurality of different lenslet diameters on the sheet of transparent material.

Alternatively, the lenticular filter comprises a two-dimensional array of non-overlapping constant width lenses, but each lens formed so as to be substantially random in power.

According to a second embodiment of the present invention, the optical distortions comprise a phase filter for randomizing the phase of local regions of imaging light. More particularly, the phase filter is so completely randomized the ability to restore the original image with a computer is difficult. Those skilled in the art will appreciate that image resolution is dependant on the width of the in-phase beam of light according to the Raleigh Limit, as discussed in detail below.

The optical distortions according to the second preferred embodiment of the present embodiment preferably comprise a plurality of cells configured so that light transmitted through a given cell is out of phase with light transmitted through a plurality of neighboring cells of the phase filter. To mitigate efforts to digitally restore the image, those cells that aren't immediate neighbors should be part of a group that has a different set of randomness. In other words the cells must be completely random across the entire face. It is not enough to repeat a small random pattern in an effort to reduce the cost of manufacture. In this manner, the light which defines the image at the focal plane is not only blurred at every point, but the amount and orientation of the blur is different from point to point on the image plane.

Preferably, such phase filtering is accomplished by defining a plurality of cells of the transparent material, wherein each cell has a thickness which is substantially random with respect to all other cells. According to the second preferred embodiment of the present invention each cell has a width of approximately 2.5 mm and a difference in thickness among cells between approximately ¼ wavelength to approximately 5 wavelengths. However, those skilled in the art will appreciate that various other widths and thickness differences may be suitable for various different applications.

Thus, according to the present invention, an aerial photography camera for use in treaty verification is provided. The aerial photography camera utilizes an optical blurring filter which is inexpensive to manufacture, and which is easy to use. Verification of treaty requirements is easily accomplished by simply noting that the optical blurring filter is in use during aerial photography. Use of the optical blurring filter of the present invention results in an image which is difficult to be digitally manipulated so as to restore the full resolution thereof. That is, the optical blurring filter introduces distortions or noise into the image in a manner which is substantially random and thus not compatible with contemporary methods of digital image enhancement.

Thus, according to the present invention, an aerial photography camera, for use in treaty verification, comprises a transparent material disposed in front of the camera lens, preferably in the filter holder thereof. The transparent material comprises a plurality of optical distortions formed therein and being formed so as to have substantially random positions and sizes so as to effect blurring of a camera image which is extremely difficult to digitally correct. The optical distortions are preferably configured so as to provide a ground resolution of between approximately 30 cm and 60 cm when pictures are taken at a predetermined altitude. The predetermined altitude is that altitude at which it is expected that the aircraft will fly during the performance of such aerial photography.

A method for forming a lenticular filter according to the present invention comprises the steps of depositing a photoresist on a transparent material, exposing the photoresist to laser speckle to effect curing thereof, developing the photoresist so as to form a mask, and etching the transparent material so as to form a plurality of protuberances upon the transparent material, the irregular surface and depressions defining the plurality of lenslets.

The step of depositing a photoresist on a transparent material preferably comprises depositing a photoresist on a sheet of glass. The step of exposing the photoresist to laser speckle preferably comprises exposing the photoresist to laser speckle generated by a HeCd laser. The step of exposing the photoresist to laser speckle having an intensity distribution which is formed according to a negative exponential function. That is, according to the preferred embodiment of the present invention, the intensity distribution of the laser speckle is such that the intensity thereof is greatest at the center of the laser beam and drops off exponentially as distance increases from the center of the laser beam.

Preferably, the laser speckle is transmitted to the photoresist via at least one, preferably a plurality of, optical fibers. The scale of the laser speckle is determined by the diameter of the optical fiber(s), as well as by the distance between the optical fiber(s) and the transparent material.

According to the present invention, a lenticular filter is formed according to the method of forming a plurality of generally concentric flat layers upon a surface of the transparent material, wherein the flat layers are configured so as to define a plurality of separate lenslets. The contours as defined by the layers generally define Fresnel zone plates. Areas defined by each pair of adjacent contour lines of such Fresnal zone plates are approximately equal, so as to provide the desired shape, i.e., curvature or power, of each lenslet. The concentric flat layers are formed either by applying transparent layers to the transparent material or by etching the transparent material.

Alternatively, a lenticular filter may be formed by placing a mask having a plurality of apertures formed therein proximate the transparent material, and directing an ion beam toward the mask such that a portion of the ion beam is transmitted through the apertures and is incident upon the transparent material and such that the ion beam etches the transparent material so as to form generally elliptical recess in the transparent material wherein the generally elliptical recesses define lenslets.

According to the present invention, the phase filter is formed by providing a sheet of transparent material and changing the thickness of the transparent material at selected locations thereof so as to provide a plurality of different random thicknesses of the transparent material. The plurality of different random thicknesses of the transparent material effect random changes in longitudinal phase of light transmitted therethrough. The step of changing the thickness of the transparent material preferably comprises adding material to the transparent material. Material is preferably added to the transparent material via vapor deposition.

Alternatively, the step of changing the thickness of the transparent material comprises removing material from the transparent material. The material is preferably removed from the transparent material via etching, preferably ion etching. Alternatively, material may be removed from the transparent material via acid etching or the like. Those skilled in the art will appreciate that various other means for removing material from the transparent material are likewise suitable.

Optionally, either embodiment of the present invention may be formed of a flexible material which can be distorted, e.g., stretched, dented, etc., preferably via computer control, so as to facilitate definition of the distortions formed therein and also so as to facilitate easy changing of such distortions.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 4 shows a lens having a single focus and therefore focusing to a point;

FIG. 4a shows the intensity of the focused light at the point due to the single focal length of the length of FIG. 4;

FIG. 5 shows a lens having a single focal length which also has a filter placed in front thereof, the filter providing additional focal lengths so as to cause a point to be focused not only upon the focal plane, but also at various differences therefrom, so as to blur the image of the point upon the focal plane;

FIG. 5a shows the intensity of the point focused by the lens and filter of FIG. 5a, wherein the point is focused at several different positions, both on the focal plane and slightly displaced therefrom such that the intensity of the focused image varies due to each of the lenslets of the filter and is consequently blurred;

FIG. 6 is a front view of a blurring filter comprised of circular lenslets having substantially random positions and sizes;

FIG. 7 is a front view of a lenticular blurring filter comprised of a plurality of elliptical lenslets having substantially random positions, angular orientations, sizes and powers, and substantially overlapping one another;

FIG. 8 shows a lenticular blurring filter comprised of lenslets formed according to a regular pattern such that each of the lenslets has a substantially identical size and does not overlap any other lenslet but each lenslet has a substantially random power;

FIG. 9 shows a phase blurring filter comprised of a sheet of transparent material, e.g., glass, having different, random thicknesses at different portions thereof according to a regular pattern;

FIG. 10 is a cross section of FIG. 9 showing the different thicknesses of the transparent material;

FIG. 11 shows the intensity versus position for a point image formed without using a blurring filter, wherein dimension A represents the point spread of the entire aperture when all of the cells are in phase, i.e., no phase filtering is being performed;

FIG. 12 shows the intensity versus position for a point image formed utilizing a phase filter according to the present invention, where dimension B represents the point spread of a single cell;

FIG. 13 schematically illustrate the exposing of a mask formed upon a sheet of transparent material using laser speckle to define a plurality of lenslets;

FIG. 14 shows an enlargement of lenslets formed upon a transparent material by forming a plurality of transparent layers thereupon;

FIG. 15 shows an ion gun, random hole pattern and substrate. This technique is needed for creating the random dimples of the lenticular blurring filter.

FIGS. 16 and 17 show a sheet of transparent material having portions thereof formed to have different thickness arranged in a regular pattern to form a phase filter; and FIG. 18 shows how randomness (noise) can be introduced into the blurring process so as to thwart digital image restoration.

DETAILED DESCRIPTION OF THE INVENTION

The detailed description set forth below in connection with the appended drawings is intended as a description of the presently preferred embodiments of the invention, and is not intended to represent the only forms in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention. The aerial photography blurring filter of the present invention is illustrated in FIGS. 1 through 17 which depict two presently preferred embodiments thereof.

As discussed in detail above, it is sometimes desirable to limit the resolution of images formed via aerial photography so as to comply with the requirements of a treaty, for example. In the case of Open Skies, the limit is 30 cm of ground resolution.

As those skilled in the art will appreciate, it is generally necessary that the ground resolution for such aerial photography be at least 60 cm so as to provide meaningful data for photo interpreters. Thus, in order to comply with the requirements of Open Skies and also to provide aerial photographs containing meaningful information, it is necessary to maintain the resolution of the aerial cameras used therefor within the narrow range of 30 cm–60 cm.

Figure 1:
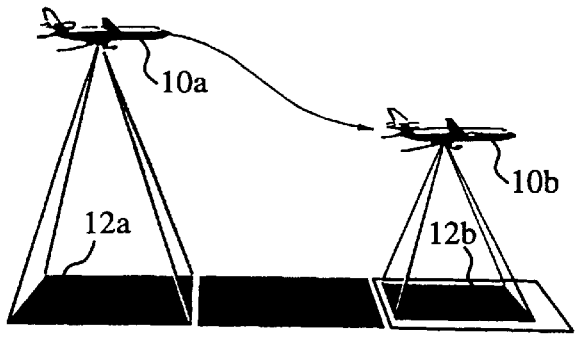
FIG. 1 is a perspective view of a single aircraft flying at two different altitudes to show the decreasing land area associated with a corresponding decrease in aircraft altitude, the decrease in ground area resulting in a corresponding increase in ground resolution.

Referring now to FIG. 1, one problem typically encountered in any attempt to maintain the resolution of an aerial camera within a narrow range is that variations of aircraft altitude substantially change the ground resolution. More particularly, an aircraft 10a flying at a given altitude and photographing a first ground area 12a will photograph a substantially smaller ground area 12b when the aircraft 10b substantially reduces altitude. As those skilled in the art will appreciate, when photographing the smaller ground area 12b with the same camera, a greater ground resolution is realized. This inherently occurs since less ground area occupies the same image area on the film.

However, aerial photographs taken with the aircraft 10b at the lower altitude may be in violation of a treaty, or otherwise undesirable due to the higher resolution provided.

It is sometimes necessary to reduce the altitude of an aircraft during the performance of aerial photography so as to avoid undesirable weather conditions. For example, it may be desirable to fly under clouds in order to perform aerial photography, since such optical images can not be taken through cloud cover. And, coming back to that area later is expensive and politically sometimes impossible.

Figure 2:
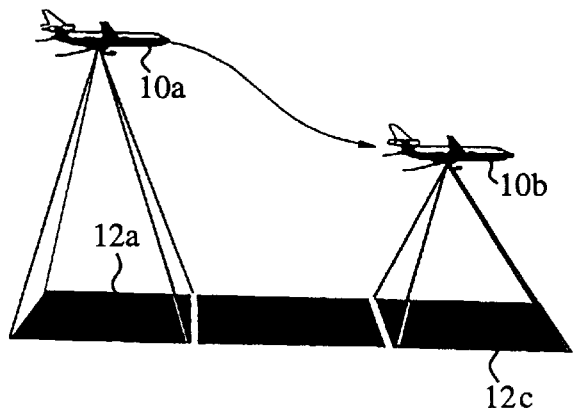
FIG. 2 is a perspective view of a single aircraft flying at two different altitudes and show no decrease in the ground area being photographed as the aircraft descends when utilizing a zoom lens. This is the normal way of maintaining constant resolution on the ground. This is expensive and procedurally impossible in the Open Skies Treaty.

Referring now to FIG. 2, a more desirable situation is thus one in which the ground area 12a remains substantially constant as an aircraft 10a descends to a lower altitude such that the aircraft 10b is photographing substantially the same ground area 12c. That is, ground area 12a is approximately equal to ground area 12c, even though the aircraft 10a is at a different altitude from the aircraft 10b. Unfortunately, this requires a change in focal length of the camera lens. This is expensive and not acceptable to the Open Skies Treaty.

According to the present invention, such a reduction in ground resolution is also achieved by inserting an optical blurring filter in front of the camera lens, generally within an existing filter holder, of the aerial photography camera when the aircraft descends to a lower than nominal altitude. This step is acceptable to the Treaty.

Such an optical blurring filter may be utilized at any desired altitude so as to provide the required ground resolution. Thus, the aircraft 10a flying at the higher altitude may either use an optical blurring filter or not use an optical blurring filter, as necessary to provide the desired ground resolution for that altitude.

A very important feature of this blurring filter is that the amount, and the character of the blur and the location of these different blurs on the film plane is under control of the designer. This control is allowed by the position of the filter plane on wide angle lenses.

The position where the filter holder is for wide angle lenses (those used most often on aerial cameras) is very unique. Obviously it is not in focus, but neither is it completely out of focus. What you do to one point in the filter plane only affects a localized area on the film. For example; if you put a ¼" dot in the center of the plane where the filter holder is, there will be a darkened region in the center of the image plane that is equal to the size of the dot plus about ½" (the size of the aperture pupil). Thus, if the distorting elements are different in magnitude and orientation from place to place on the filter plane then the resulting point spread function will be different from place to place on the film plane. This only happens on wide angle lenses. Telephoto lenses have the pupil out in front, very close to where the filter holder is, and any point there will have an equal effect on all regions of the film.

The entrance pupil of a wide angle lens is not the diameter of the first lens. It is usually 6 to 8 times smaller than that. For example, the KS87 the Open Skies camera uses, the filter holder is 4" across but the pupil is only 0.67". If you distort a region in the center of the filter holder—a ½" area for example, there will be a zone in the center of the film plane that is out of focus. That zone will be about an inch across and more out of focus in the center than in the rest of the one inch zone. If the distorted region is placed on the left edge of the filter holder, the right edge of the film will have a 1" region of blurriness. Longitudinal placement of the filter is preferably as far from the aperture stop as possible. For wide angle lenses the filter holder is suitable.

Figure 3:
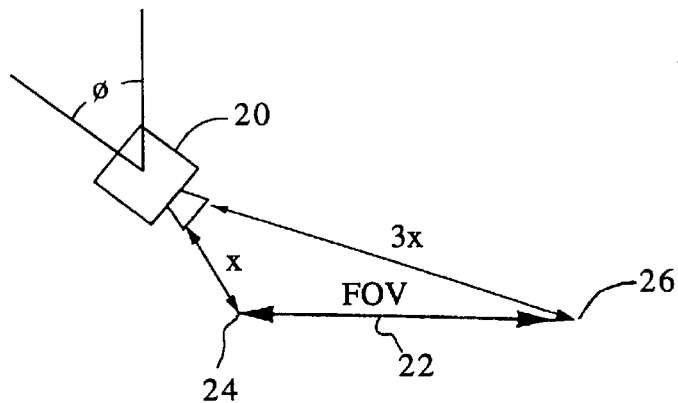
FIG. 3 is a schematic drawing showing the geometry associated with oblique photography wherein the closer portion of the field of view (FOV) is photographed at a higher resolution than the farther portion thereof due to the smaller distance to the closer portion of the field of view than to the farther portion thereof.

Referring now to FIG. 3, it is an inherent property of oblique photography that one portion of the photographed image possess a higher resolution than another portion thereof. The geometry associated with this property of oblique photography is illustrated in FIG. 3, wherein camera 20 photographs the ground or field of view 22 at an angle θ, rather than pointing directly downward. It is easy to see that the distance x from the camera 20 to the nearer portion 24 of field of view 22 is much less than the distance 3x from the camera 20 to the far portion 26 of the field of view. Thus, that portion of the photograph bearing the near portion 24 of the field of view 22 will be at a substantially higher ground resolution than that portion of the photograph bearing the far portion 26 of the field of view 22. The closer the camera, the higher the resolution.

It is also well known that cameras generally provide greater resolutions at some portion of the image than at other portions thereof. For example, cameras generally provide greater resolution near the center of the focal plane since light traveling on-axis with the lens is generally less distorted thereby. Thus, the present invention provides means for not only reducing the resolution of an image formed via aerial photography as the photographing aircraft flies at different altitudes, but also provides means for making such aerial photographs such that they have a substantially constant or uniform resolution throughout the image.

According to the present invention, a blurring filter can be formed so as to provide different degrees of blurring at different portions of the focal plane, so as to compensate for the inherent differences in resolution due to camera construction, the performance of oblique photography, or for any other reason.

In the above paragraphs the amount of blurring across the film plane is controlled. It can also be totally random. Digital image enhancement is thwarted if the amount and detailed character of the blurring is random. This randomness can be in addition to the controlled increase of blur introduced for other reasons. Thus an oblique camera can be tailored for constant ground resolution and render it resistant to digital enhancement.

Referring now to FIG. 4, a lens 30 focuses light 31 to a point $x_o$ upon the focal plane 32. As used herein, the term lens includes any single or multiple lens assembly utilized by a camera to focus an image upon the film or focal plane thereof.

Referring now to FIG. 4a, the lens of FIG. 4 thus produces an intensity curve which is comparatively sharp, i.e., having a well defined peak, about the focal point $x_o$.

Referring now to FIG. 5, the introduction of a lenticular optical blurring filter 34 according to the present invention causes blurring about the focal point $x_o$. As shown, the optical blurring filter 34 is positioned in front of lens 30. However, those skilled in the art will appreciate that various different positions on either side of lens 30 are likewise suitable as long as it is removed from the aperture stop of the lens. The optical blurring filter 34 is positioned in front of lens 30 according to preferred embodiment of the present invention so as to take advantage the filter holder which is commonly present on cameras typically utilized in aerial photography.

The optical blurring filter 34 comprises a plurality of separate lenslets 36 formed thereon so as to cause light 31 to focus at different points 38, 40 which are not upon the focal plane 32. Thus, the light which is transmitted through the lenslet 36 does not form a well defined point upon the focal plane 32, but rather contributes to blurring of the image at the focal $x_o$.

Referring now to FIG. 5a, such blurring is shown in an intensity graph, wherein the original lens 30 forms a well defined intensity peak 42, as in FIG. 4a, whereas lenslets 36 caused the formation of less well defined intensity peaks 44, 46. Those skilled in the art will appreciate that such less defined intensity peaks 44 and 46 spread the image about the focal point $x_o$, thus effecting blurring thereof upon the focal plane 32. In effect, the lenslets 36 define distortions within the lens system of the camera which prevent the camera from focusing to its full capability. These distortions or lenslets 36 are formed upon the optical blurring filter such that it may be easily introduced or removed from the camera.

Referring now to FIG. 6, the optical blurring filter 34 is shown in a front view so that a plurality of the lenslet 36 can be seen. According to this particular configuration of a lenticular optical blurring filter, the lenslets 36 are formed to have substantially random positions and sizes, i.e., diameters. Optionally, the lenslets 36 may be formed so as to have different shapes, preferably elliptical shapes, and so as to have diameters which cause adjacent lenslets 36 to substantially overlap one another, as discussed in detail below.

Referring now to FIG. 7, a lenticular optical burring filter 50 comprises a plurality of elliptical lenslet 52, wherein each lenslet 52 is substantially random in size and angular orientation and has a substantially random power and position upon the optical burring filter 50. Although the optical blurring filter is illustrated here as being generally rectangular in shape, those skilled in the art will appreciate that any desired shape may be provided. Generally, the shape of the optical blurring filter will be so as to conform to convention filter holders so as to facilitate the easy insertion and removal thereof. That is, according to the preferred embodiment of the present invention the optical blurring filter is sized and configured so as to conform to those filters presently being utilized with a particular camera such that they are generally interchangeable therewith.

Referring now to FIG. 8, an alternative configuration of the optical blurring filter 54 comprises a plurality of uniform cells 56. Each cell comprises a separate, non-overlapping lenslet. Although the position and shape of each lenslet of FIG. 8 is well defined, the power of each lenslet is random, so as to effect the desired blurring.

When random powers of lenslets are used in any configuration of the present invention, the powers are randomly distributed, preferably according to a Gaussian distribution, about a single desired power which is calculated so as to provide the desired blurring effect.

Referring now to FIG. 9, the second embodiment of the optical blurring filter 60 of the present invention comprises a phase filter wherein different portions of the filter effect different, preferably substantially random, phase changes in the light transmitted therethrough. Those skilled in the art will appreciate that the resolving power of an optical system is substantially dependant upon the ability of that system to maintain the phase of light transmitted therethrough. For example, it is easy to appreciate that when spacial phase changes are introduced, such phase changes will result in undesirable constructive and destructive interferences, which degrade image resolution substantially.

Thus, according to the second preferred embodiment of the present invention, a phase filter comprises a generally transparent sheet of planar material having a plurality of cells 62 defined therein such that each cell contributes a random phase distortion to light passing therethrough. Thus, light passing through one cell 62 may incur phase shift of 0.2 wavelength, whereas light passing through an adjacent cell 62 may incur a phase shift of 2.4 wavelengths, for example. As those skilled in the art will appreciate, such random phase shifts limit the resolution of an image to the Raleigh limit of the width of any one cell.

Referring now to FIG. 10, the phase filter of FIG. 9 is shown in cross section. As is clear in cross section, exemplary cells 62a, 62b, 62c are formed so as to define portions of different thickness of the phase filter 60. As those skilled in the art will appreciate, when light enters an optically denser medium, i.e., one having a greater index, the speed of the light is reduced. The longer such light travels through the denser medium, i.e., the filter portion, the longer it takes for the light to reach the other side of the filter and consequently the longer it takes the light to reach the focal plane. Such delays in the speed with which light is propagated results in corresponding shifts in the relative phase thereof.

Referring now to FIG. 11, it can be seen that an optical system such as a camera provides a comparatively well defined intensity peak when a point is focused on the focal plane thereof without a phase filter. Dimension A represents the point spread of the entire aperture when all cells are in phase, i.e., no filter is in use.

Referring now to FIG. 12, the intensity curve is substantially flattened and broadened when an optical blurring phase filter according to the present invention is inserted in front of the camera lens. That is, the well defined spot of FIG. 11 is caused to blur or spread substantially. Dimension B shows the spread resulting from having all cells out of phase with one another, such that the point of FIG. 11 is blurred substantially. The spread shown in FIG. 12 is the same as when an aperture having a diameter equal to the width of one cell is utilized. Thus, the Raleigh diffraction limit provided by a plurality of cells which are out of phase is equal to that Raleigh diffraction limit obtained by having an aperture with a size equal to that of a single cell.

Methods for forming the two embodiments of the optical blurring filters of the present invention are illustrated in FIGS. 13 through 17.

Referring now to FIG. 13, according to one preferred method for forming a lenticular filter 100, lenslets 102 are defined by curing a photoresist applied to a sheet of transparent material after exposure with a laser 104, the output of which is focused via lens 106 onto at least one optical fiber 108. Laser speckle radiated from the optical fiber 108 is directed onto the photoresist to create the desired pattern thereof in a manner which defines the lenslets 102. Thus, after the uncured photoresist is washed from the sheet of transparent material and the material is acid etched, the lenslets are defined. This process may be repeated as desired, each time forming smaller and smaller portions of the lens, as discussed in detail below.

Referring now to FIG. 14, the lenslets of FIG. 13 comprise either a plurality of concentric plateaus or depressions 110, each having a different height above or below the original surface of the transparent material, so as to form either raised or etched lenslets 102.

As those skilled in the art will appreciate, each lenslet 102 may be formed either by adding transparent material to the transparent medium or by removing material therefrom, so as to define a generally lens shaped protrusion or depression. Etching may be either performed so as to remove material adjacent the lenslets, thereby resulting in the lenslets being defined by protrusion of the transparent material or by etching the lenslets themselves, thereby resulting in the lenslets being depressions formed in the transparent material.

Referring now to FIG. 15, a lenticular filter may be formed by directing an ion beam generator 200 through apertures 202 formed in a mask 204 such that the mask 204 causes the ion beam to be separated into a plurality of separate beams which etch dimples 206 into the transparent substrate 208, thereby defining a plurality of lenslets.

Referring now to FIG. 16, a phase filter according to the second embodiment of the present invention may be formed with vacuum deposition through a mask on to a clear substrate in a manner which increases the thickness thereof sufficiently so as to introduce random phased distortions.

Referring now to FIG. 17, the phase filter 400 is formed so as to define a plurality of cells 402 which define areas of varying thickness of the generally transparent substrate or sheet upon which they are formed according to horizontal profile 404 and vertical profile 406. Horizontal profile 404 represents an exemplary row of the phase filter and vertical profile 406 represents a portion of an exemplary column thereof. Thus, according to one preferred method for forming a phase filter according to the present invention, layers shown in FIG. 16 are applied to the substrate.

The phase filter 400 is formed large enough that it substantially covers the pupil 408 of the camera so as to assure adequate randomizing of the phase of light used to form an image upon the focal plane.

FIG. 18 shows the mechanism for tailoring the amount of blur across the film plane. Light from a distant object (point on the ground) 504 is brought to focus on the film plane 501. If the object is slightly off axis the focus point 501 will be slightly off center. What is important here is that the light that goes to that point went through only the region 507 of the filter plane 503. The reason is that the entrance aperture 506 in a wide angle lens is displaced from the filter plane. That means that the amount and orientation of the distortion at 507—and the consequent amount and orientation of the blur on the film plane—can be made different from place to place. The distortions at the filter plane can be gradually increased in places (for example, one side more than another) so as to compensate for better performing regions of the camera (as in oblique photography).

If the distortions are also made to be random (entirely random or added to the gradual changes described above) then digital image restoration is thwarted. The reason for that can be seen in the physics of blurring. Normally we refer to any form of image degradation as blurring. But the kind of blurring introduced by out-of-focus lenses (or lenslets) appears as a glow or fuzziness around points and edges. That's the kind of blurriness digital image restoration can deal with. Another kind of blurring, something one would describe as "splotchy", is a randomness in the shape and size of the smallest possible image element from one area to another on the film plane. Film grain causes a splotchiness that changes from one point to even an adjacent point. Digital image restoration is completely thwarted by that much randomness in the blurring. The method of blurring in this invention is not that random. It is limited to an adjacency of no closer than one entrance pupil width. But it is enough to discourage any attempt to restore the image.

It is worthwhile to note that the distortions of the present invention tend to increase the width of that portion of the point spread functions between the ½ amplitude points thereof, without substantially increasing the widths of the skirts of the point spread functions. That is, the shape of the point spread functions tends to change, e.g., flatten, without changing the overall size thereof.

Thus, according to the present invention, an apparatus is provided for effecting a desired blurring of images obtained from aerial photography so as to comply with a treaty or so as to meet any other requirement for limiting resolution. The resolution is limited in a manner which is easily understood and verifiable. The cost associated with constructing and implementing such image blurring is minimal.

It is understood that the exemplary optical blurring filters described and shown in the drawings represent only presently preferred embodiments of the invention. Indeed, various modifications and additions may be made to such embodiments without departing from the spirit and scope of invention. For example, the optical blurring filters may be of any desired shape and/or configuration. Thus, the optical blurring filters may be generally circular, elliptical, square, rectangular, octagonal, heptagonal, hexagonal, etc., in shape. The optical blurring filters need not be generally planar or sheet like in configuration. They may alternatively be generally cylindrical or prism-like, i.e., having a substantial depth or thickness. Further, either the lenslets or the cells of the phase filter may be of any desired configuration. Thus, the lenslets or phase cells need not be generally circular or elliptical, but rather may be circular, elliptical, square, rectangular, hexagonal, octagonal, etc. Thus, these and other modifications and additions may be obvious to those skilled in the art and may be implemented to adapt the present invention for use in a variety of different applications.

What is claimed is:

1. An optical blurring filter for intentionally blurring camera images, the filter comprising:
    a) a sheet of transparent plastic material; and
    b) a plurality of optical distortions formed in the transparent material, the optical distortions being formed so as to have substantially random point spread functions throughout the image, the point spread functions having a width and a shape which causes a predetermined degree of blurring;
    c) wherein placement of the transparent material in the optical path of a camera effects image blurring randomly so as to thwart attempts to digitally undo the blurring.

2. The optical blurring filter as recited in claim 1, wherein the optical distortions comprise random power lenslets.

3. The optical blurring filter as recited in claim 1, wherein the optical distortions formed in the transparent material are configured so as to provide greater resolution reduction on a near side than on a far side when performing oblique photography.

4. The optical blurring filter as recited in claim 1, wherein the optical distortions formed in the transparent material are formed according to a gradient so as to provide varying resolution from one side of an image to another side thereof, so as to facilitate oblique photography in a manner which makes resolution generally uniform across a photograph.

5. The optical blurring filter as recited in claim 1, wherein the optical distortions formed in the transparent material are formed so as to provide greater distortion in selected portions thereof, so as to compensate for areas of greater resolution of the camera.

6. The optical blurring filter as recited in claim 1, wherein the optical distortions are produced by a lenticular filter.

7. The optical blurring filter as recited in claim 1, wherein the optical distortions are produced by a lenticular filter, the lenticular filter comprising a plurality of lenses formed so as to be substantially random in power.

8. The optical blurring filter as recited in claim 1, wherein the optical distortions are produced by a lenticular filter, the lenticular filter comprising a plurality of lenses formed in the sheet of transparent material, the lenses formed such that a photograph formed therewith is formed with light where only a portion of the light passes through lenslets.

9. The optical blurring filter as described in claim 1, wherein the optical distortions are produced by a lenticular filter, the lenticular filter comprising a plurality of lenses formed so has to substantially overlap one another and so as be random in power.

10. The optical blurring filter as recited in claim 1, wherein the optical distortions are produced by a lenticular filter, the lenticular filter are comprising a plurality of lenses, each lens having a generally elliptical periphery wherein a major axis and a minor axis for each lens is substantially random in length and angular orientation.

11. The optical blurring filter as recited in claim 1, wherein the optical distortions are produced by a lenticular filter, the lenticular filter comprising a plurality of lenses formed so as to define a plurality of different thicknesses of the sheet of transparent material.

12. The optical blurring filter as recited in claim 1, wherein the optical distortions are produced by a lenticular filter, the lenticular filter comprising a two-dimensional array of non-overlapping lenses, each lens formed so as to be substantially random in power.

13. The optical blurring filter as recited in claim 1, wherein the optical distortions comprise a phase filter for changing a phase of at least a portion of light transmitted in therethrough.

14. The optical blurring filter as recited in claim 1, wherein the optical distortions comprise a phase filter, the phase filter comprising a plurality of cells configured so that light transmitted through a given cell to a focal plane is out of phase with light transmitted through a plurality of other cells to the focal plane.

15. The optical blurring filter as recited in claim 1, wherein the optical distortions comprise a phase filter, the phase filter comprising a plurality of cells, wherein each cell has a thickness which is substantially random with respect to other cells.

16. The optical blurring filter as recited in claim 1, wherein the optical distortions comprise a phase filter, the phase filter comprising a plurality of cells, wherein each cell has a thickness which is substantially random with respect to the other cells and wherein the cells have a width which defines the approximate width of the blurriness.

17. An aerial photography camera for use in treaty verification, the aerial photography camera comprising:
   a) a camera lens;
   b) a transparent material disposed in front of the camera lens;
   c) a plurality of optical distortions formed in the transparent material, the optical distortions being formed so as to have substantially random positions and sizes resulting in point spread functions having a width and a shape which causes a predetermined degree of blurring;
   d) wherein the transparent material effects blurring of a camera image which is substantially resistant to digital correction.

18. The aerial photography camera as recited in claim 17, wherein the optical distortions are configured to provide a ground resolution of between approximately 30 cm and approximately 60 cm when pictures are taken at a predetermined altitude lower than design altitude for that camera.

19. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions formed in the transparent material are configured so as to provide greater resolution reduction on a near side than on a far side when performing oblique photography; and
   d) wherein placement of the transparent material in the optical path of a camera effects image blurring randomly so as to thwart attempts to digitally undo the blurring.

20. The optical blurring filter as recited in claim 19, wherein the transparent material comprises glass.

21. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions formed in the transparent material are formed according to a gradient so as to provide varying resolution from one side of an image to another side thereof, so as to facilitate oblique photography in a manner which makes resolution generally uniform across a photograph; and
   d) wherein placement of the transparent material in the optical path of a camera effects image blurring randomly so as to thwart attempts to digitally undo the blurring.

22. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions formed in the transparent material are formed so as to provide greater distortion in selected portions thereof, so as to compensate for areas of greater resolution of the camera; and
   d) wherein placement of the transparent material in the optical path of a camera effects image blurring randomly so as to thwart attempts to digitally undo the blurring.

23. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter; and d) wherein placement of the transparent material in the optical path of a camera effects image blurring randomly so as to thwart attempts to digitally undo the blurring.

24. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter comprising a plurality of lenses formed so as to be substantially random in power; and d) wherein placement of the transparent material in the optical path of a camera effects image blurring randomly so as to thwart attempts to digitally undo the blurring.

25. An optical blurring filter for intentionally blurring camera images, the filter comprising:

a) a sheet of transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter comprising a plurality of lenses formed in the sheet of transparent material, the lenses formed such that a photograph formed therewith is formed with light where only a portion of the light passes through lenslets; and d) wherein placement of the transparent material in the optical path of a camera effects image blurring randomly so as to thwart attempts to digitally undo the blurring.

26. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter comprising a plurality of lenses formed so has to substantially overlap one another and so as be random in power; and d) wherein placement of the transparent material in the optical path of a camera effects image blurring randomly so as to thwart attempts to digitally undo the blurring.

27. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter are comprising a plurality of lenses, each lens having a generally elliptical periphery wherein a major axis and a minor axis for each lens is substantially random in length and angular orientation; and d) wherein placement of the transparent material in the optical path of a camera effects image blurring randomly so as to thwart attempts to digitally undo the blurring.

28. An optical blurring filter for intentionally blurring camera images, the filter comprising:

a) a sheet of transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter comprising a plurality of lenses formed so as to define a plurality of different thicknesses of the sheet of transparent material; and d) wherein placement of the transparent material in the optical path of a camera effects image blurring randomly so as to thwart attempts to digitally undo the blurring.

29. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions are produced by a lenticular filter, the lenticular filter comprising a two-dimensional array of non-overlapping lenses, each lens formed so as to be substantially random in power; and d) wherein placement of the transparent material in the optical path of a camera effects image blurring randomly so as to thwart attempts to digitally undo the blurring.

30. An optical blurring filter for intentionally blurring camera images, the filter comprising:

a) a transparent material; and b) a plurality of optical distortions formed in the transparent material, the optical distortions being formed so as to have substantially random point spread functions throughout the image, the point spread functions having a width and a shape which causes a predetermined degree of blurring;

c) wherein the optical distortions comprise a phase filter for changing a phase of at least a portion of light transmitted in therethrough; and d) wherein placement of the transparent material in the optical path of a camera effects image blurring randomly so as to thwart attempts to digitally undo the blurring.

31. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions comprise a phase filter, the phase filter comprising a plurality of cells configured so that light transmitted through a given cell to a focal plane is out of phase with light transmitted through a plurality of other cells to the focal plane; and
   d) wherein placement of the transparent material in the optical path of a camera effects image blurring randomly so as to thwart attempts to digitally undo the blurring.

32. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions comprise a phase filter, the phase filter comprising a plurality of cells, wherein each cell has a thickness which is substantially random with respect to other cells; and
   d) wherein placement of the transparent material in the optical path of a camera effects image blurring randomly so as to thwart attempts to digitally undo the blurring.

33. An optical blurring filter for intentionally blurring camera images, the filter comprising:
   a) a transparent material; and
   b) a plurality of optical distortions formed in the transparent material, the optical distortions being formed so as to have substantially random point spread functions throughout the image, the point spread functions having a width and a shape which causes a predetermined degree of blurring;
   c) wherein the optical distortions comprise a phase filter, the phase filter comprising a plurality of cells, wherein each cell has a thickness which is substantially random with respect to the other cells and wherein the cells have a width which defines the approximate width of the blurriness; and
   d) wherein placement of the transparent material in the optical path of a camera effects image blurring randomly so as to thwart attempts to digitally undo the blurring.

* * * * *

UNITED STATES PATENT AND TRADEMARK OFFICE
CERTIFICATE OF CORRECTION

PATENT NO.    : 6,052,230
DATED         : April 18, 2000
INVENTOR(S)   : Walter Dennis Clark It is certified that error appears in the above-identified patent and that said Letters Patent is hereby corrected as shown below:

<u>Column 1,</u>
After title please insert
           GOVERNMENT RIGHTS

This invention was made with Government Support under contract DNA001-93-C00223 awarded by The Defense Threat Reduction Agency (DTRA). The Government has certain rights in this invention.

Signed and Sealed this

Nineteenth Day of March, 2002

Attest:

Attesting Officer

JAMES E. ROGAN
Director of the United States Patent and Trademark Office